No. 654,446. Patented July 24, 1900.
P. S. DUREL.
POWER TRANSMITTING MECHANISM.
(Application filed Jan. 26, 1900.)
(No Model.) 4 Sheets—Sheet 1.
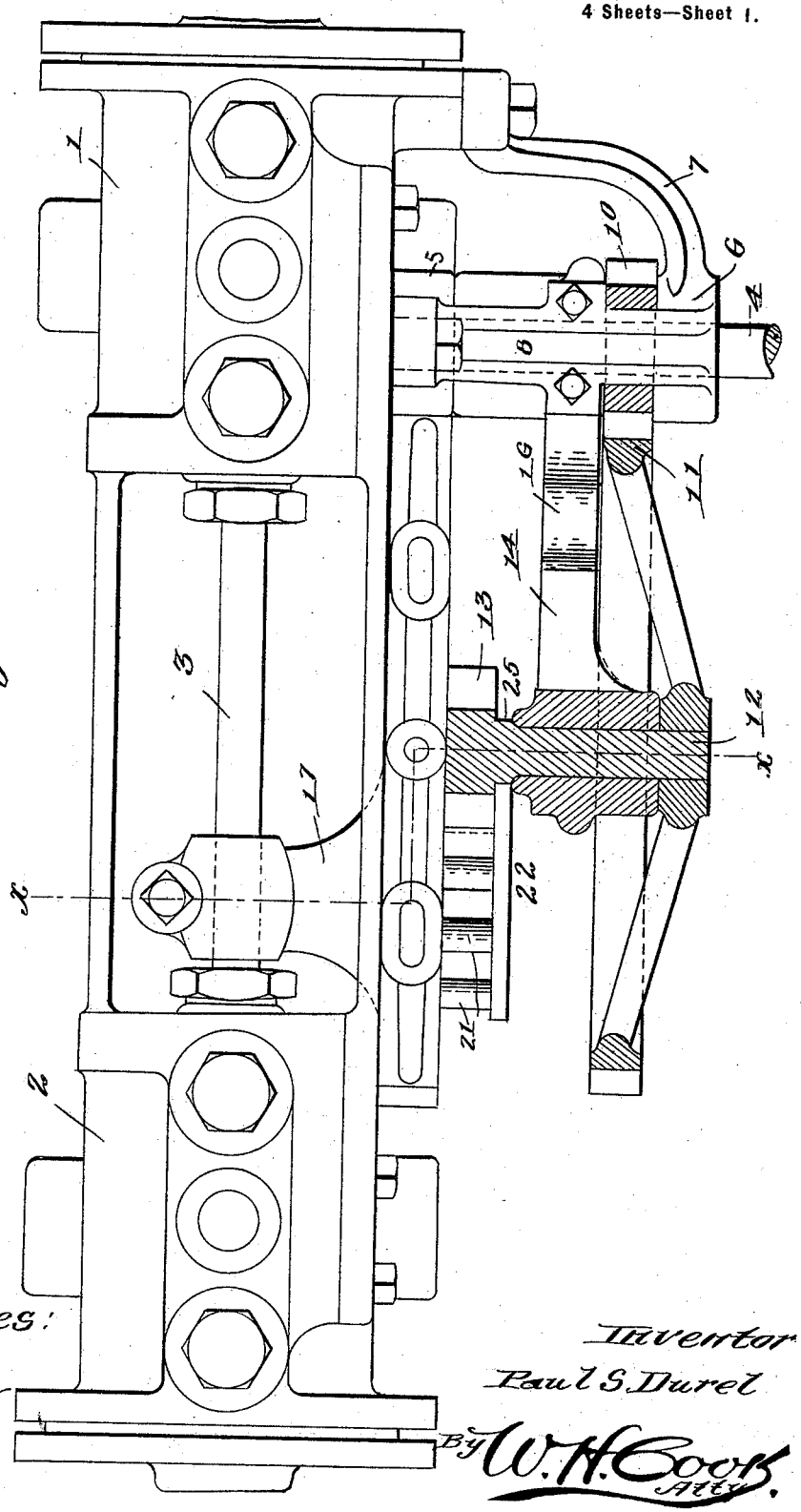
Witnesses:
Inventor
Paul S. Durel
By W. H. Cook
Atty.

No. 654,446. Patented July 24, 1900.
P. S. DUREL.
POWER TRANSMITTING MECHANISM.
(Application filed Jan. 26, 1900.)
(No Model.) 4 Sheets—Sheet 2.
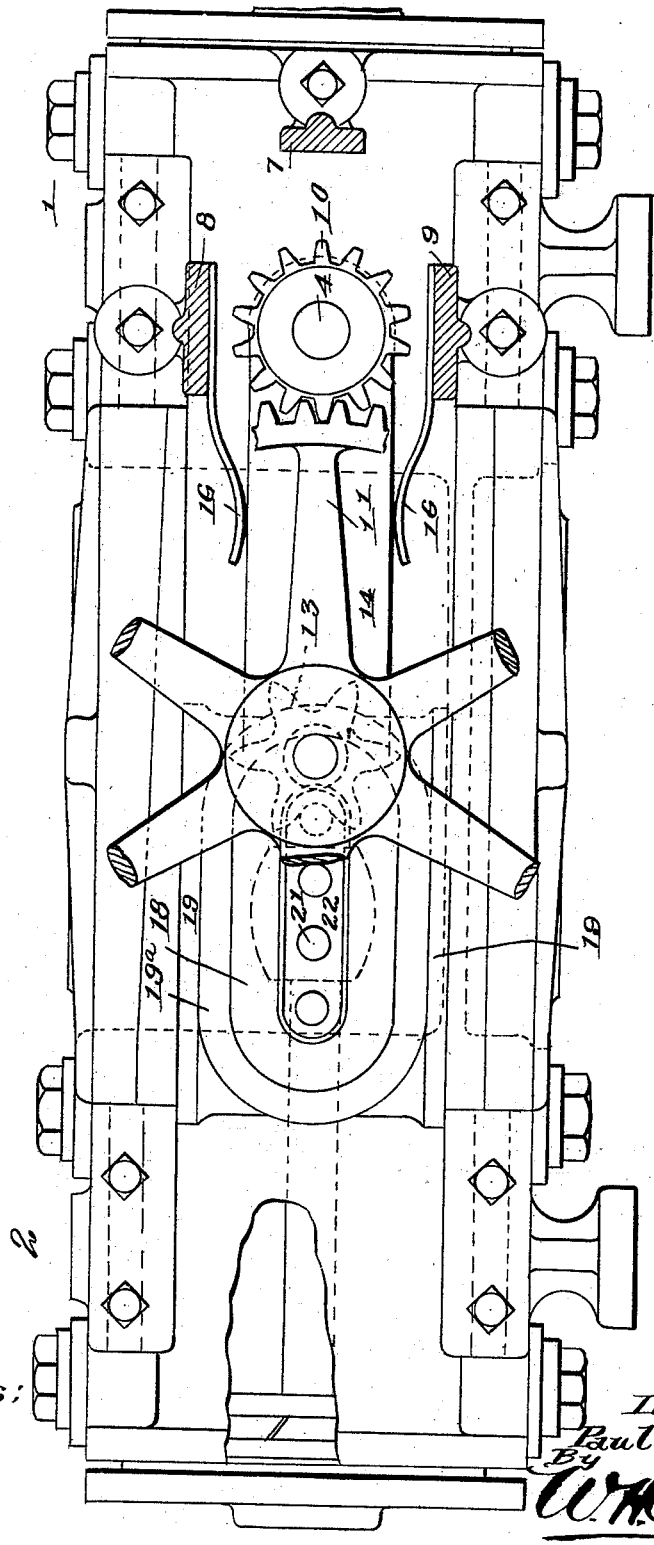

No. 654,446. Patented July 24, 1900.
P. S. DUREL.
POWER TRANSMITTING MECHANISM.
(Application filed Jan. 26, 1900.)
(No Model.) 4 Sheets—Sheet 3.
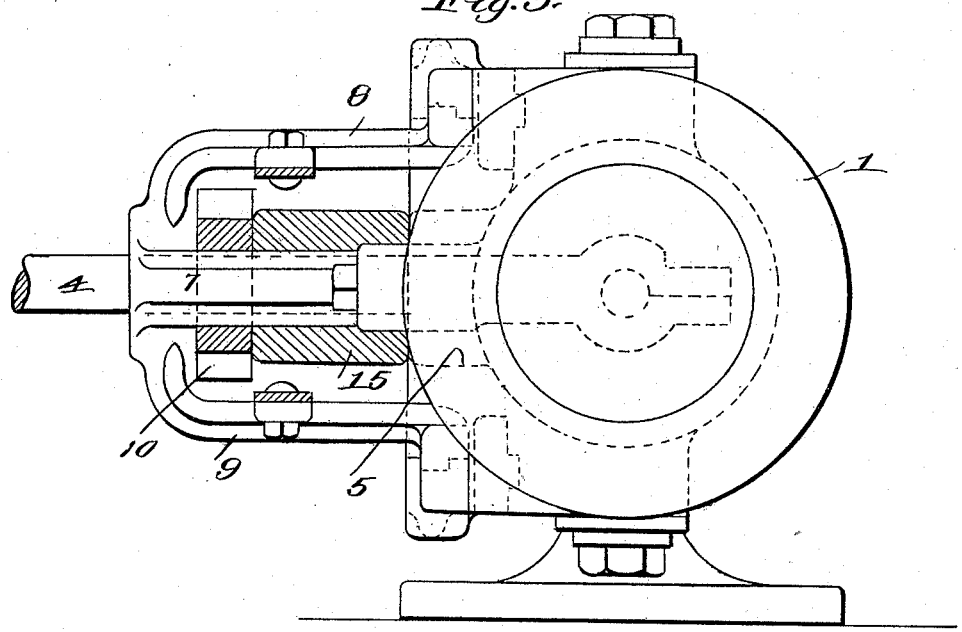
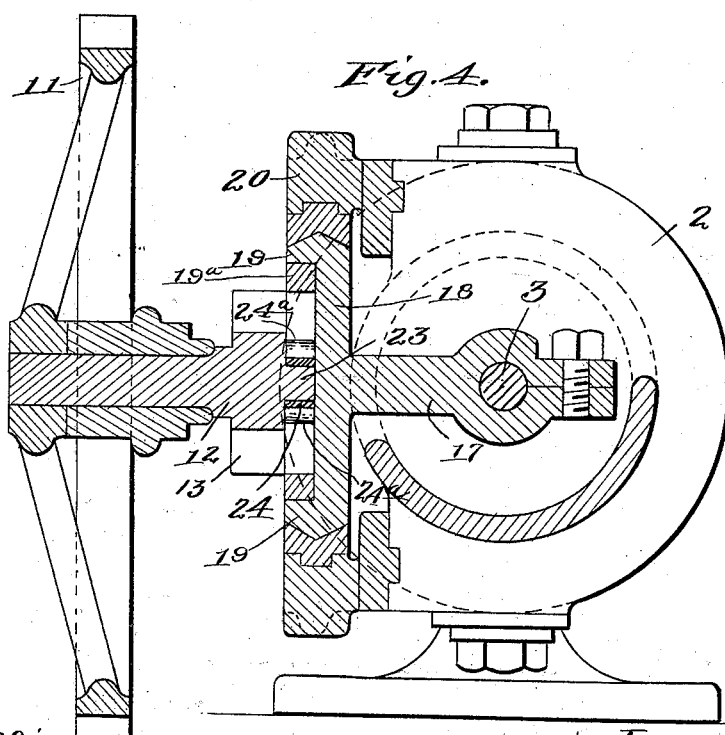
Witnesses:
Inventor
Paul S. Durel
By W. H. Cook Atty No. 654,446. Patented July 24, 1900.
P. S. DUREL
POWER TRANSMITTING MECHANISM.
(Application filed Jan. 26, 1900.)
(No Model.) 4 Sheets—Sheet 4.

Witnesses:

Inventor
Paul S. Durel
By W. H. Cook
Atty

UNITED STATES PATENT OFFICE.

PAUL S. DUREL, OF NEW ORLEANS, LOUISIANA, ASSIGNOR OF ONE-HALF TO PAYNE & JOUBERT, OF SAME PLACE.

POWER-TRANSMITTING MECHANISM.

SPECIFICATION forming part of Letters Patent No. 654,446, dated July 24, 1900.

Application filed January 26, 1900. Serial No. 2,907. (No model.)

*To all whom it may concern:*

Be it known that I, PAUL S. DUREL, a citizen of the United States, residing at New Orleans, parish of Orleans, and State of Louisiana, have invented certain new and useful Improvements in Power-Transmitting Mechanism, of which the following is a specification.

My invention relates to power-transmitting mechanism for converting rotary into reciprocating motion or the reverse, the same being particularly designed for use in connection with air-compressors.

One object of the invention is to provide means for transmitting power which will dispense with the use of cranks and pitmen, eccentrics, eccentric-rods, and the like, thereby reducing the number of parts, and consequently reducing the cost of construction and the expense of maintenance of devices of the character described.

A further object of the invention is to provide means whereby a long piston-stroke of uniform power may be obtained and to avoid the jamming of the parts at the end of the stroke by causing the speed of the piston to slow up, thereby enabling the full expansion and escape of the compressed air or gases from the cylinders in which they are located.

Other objects of the invention will hereinafter appear and the novel features thereof will be set forth in the claims.

Figure 5:
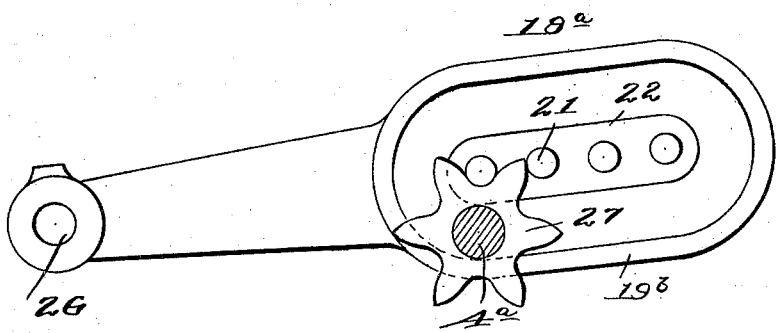
Figure 6:
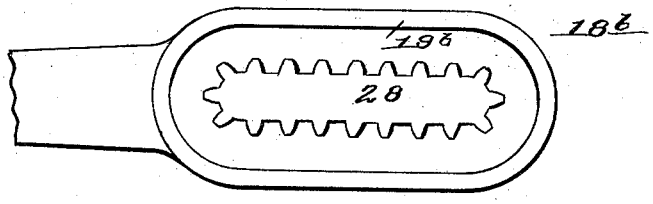

In the drawings forming part of this specification, Figure 1 is a plan view, partly in section, showing the application of my invention to a double-cylinder air-compressor. Fig. 2 is a side elevation of the same, partly in section. Fig. 3 is a sectional end elevation. Fig. 4 is a cross-section on the line $x\ x$ of Fig. 1. Fig. 5 is a detail side elevation illustrating a modification, and Fig. 6 is a similar view illustrating a second modification.

Like reference-numerals indicate like parts in the different views.

I have shown my invention in connection with an air-compressor, in which 1 and 2 represent the double cylinders, placed with their axes in alinement with each other and having a common piston-rod 3 connecting the pistons thereof. The rotary driving-shaft 4, through which the power is to be transmitted to the piston-rod 3 in the form of reciprocating motion, has its outer end mounted in bearings in a boss 5 on the side of the cylinder 1 and is also supported in bearings 6 in the ends of the bracket-arms 7 8 9, also secured to the outside of the cylinder 1. Secured to the driving-shaft 4 is a pinion 10, which meshes with a gear-wheel 11, whose hub is secured to the shaft 12, which carries a pinion 13 upon its inner end, which is either formed integral therewith or secured thereto. The shaft 12 is loosely mounted in bearings in the outer end of the bar 14 and the inner end of said bar is formed with a bearing-sleeve 15, which loosely embraces the driving-shaft 4. The upper and lower sides of the rod or bar 14 are engaged by the free ends of springs 16, which tend to resist the pivotal movement of said rod on the shaft 4 and to return said rod to its normal position when moved upwardly or downwardly.

Adjustably mounted on the piston-rod 3 is a laterally-extending arm 17, which has formed integral with its outer end a frame 18, having two parallel flanges 19 on its upper and lower edges, respectively. Secured to the frame 18 and located between the flanges 19 thereon is a substantially-elliptical guide-ring $19^a$. The frame 18 is mounted to slide longitudinally back and forth in the guides 20, secured to the framework between the cylinders 1 and 2. Secured to the frame 18 and extending outwardly therefrom beyond the ring $19^a$ are pins or projections 21, the said pins being located within the said ring and disposed at equal distances apart. They are also located in a direct line with each other and parallel with the guides 20, within which the frame 18 reciprocates. The free or outer ends of said pins are connected by a plate 22, which plate is of substantially-elliptical contour, having straight sides and rounded ends, said sides and ends being parallel with the inner walls of the ring $19^a$. The inner end of the shaft 12, beyond the pinion 13 thereon, is formed with a stud or projection 23, on which is mounted a roller 24, as clearly shown in Fig. 4 of the drawings. This roller lies within a recess in the frame 18, which is formed by the ring $19^a$ and a central substantially-elliptical projection $24^a$ on said frame, which projection is located directly behind the plate 22 and is parallel therewith. The said roller is adapted to engage the inner wall of said ring and the outer edge of said projection. The said ring and projection therefore serve as a guide for said roller. The plate 22, which connects the outer or free ends of the pins 21, serves to distribute the pressure on said pins equally throughout and also acts as a guide for the shaft 12, the said plate fitting within the recess or cut-away portion 25 on said shaft adjacent to the pinion 13.

From the foregoing description it will be seen that as the shaft 4, which engages the ring 19ª and the projection 24ª, rotates it will, through the pinion 10 thereon, transmit its rotary movement to the gear-wheel 11, secured to the shaft 12. The pinion 13 on said shaft engages the pins 21 on the frame 18, and as the latter pinion is rotated it will engage successively the pins 21 and cause the reciprocation of the frame 18 and of the piston-rod 3, to which said frame is connected. During the movement of the frame 18 the bar 14, in which the shaft 12 is mounted, is raised and lowered at each end of the stroke of the piston-rod 3, the same being guided in its movements by the roller 24 and by the plate 22, whose periphery engages the cut-away portion 25 of the shaft 12. The power from the shaft 4 is therefore applied equally to the piston-rod 3 throughout the greater part of the stroke of the latter—that is, while the pinion 13 is engaging the intermediate pins 21 of the series. When said pinion engages the pin 21 at either end of the series, the motion of the piston-rod is first slowed down, then stopped, and afterward slowly started in the opposite direction, due to the action of the pinion 13 encircling pin 21, said pinion being guided in its course by roller 24 following the contour of the inner wall of the flange 19, the result being that a short interval of time is given in which the compressed air or gases in the cylinder 1 or 2, according to which one is being acted upon, may completely expand and escape through the valved discharge-openings.

In the form of my invention illustrated in Fig. 5 of the drawings the frame 18ª instead of being rigidly connected to the piston-rod is pivotally connected therewith, as shown at 26, by means of which said frame may rock slightly up and down. The pinion 27, which engages the pins 21 on the frame 18ª, is connected directly with the drive-shaft 4ª, and said drive-shaft and said pinion are incapable of any except rotary movement. The operation of this form of my invention is similar to that described with reference to the form shown in Figs. 1, 2, 3, and 4 of the drawings, except that instead of the operating-pinion moving around the guide-ring 19ª on the frame said frame itself moves around the pinion 27 and the shaft 4ª, the same being guided in its movements by the engagement of said shaft with the inner wall of the flange 19ᵇ and the periphery of the plate 22.

In Fig. 6 of the drawings the frame 18ᵇ, corresponding with the frame 18, heretofore referred to, is provided with an endless rack 28, located within the flange 19ᵇ and having parallel straight sides and rounded ends, said rack being adapted to be engaged by the pinion 13 or the pinion 27 and serving as a substitute for the pins 21.

Having now described my invention, what I claim as new, and desire to secure by Letters Patent, is—

1. In power-transmitting mechanism, the combination of a rotary shaft, a pinion thereon, a reciprocating shaft, a frame connected thereto having a substantially-elliptical guide-ring thereon, pins or projections on said frame within said ring, a pinion adapted to engage said pins and to be guided around said frame by said ring and a gear-wheel secured to the pinion engaging said pins and meshing with the pinion on said rotary shaft.

2. In power-transmitting mechanism, the combination with a rotary drive-shaft and a pinion thereon, of an arm or bar pivoted to said shaft, a gear-wheel having bearings in the outer end of said arm and engaging said pinion, a pinion secured to said gear-wheel, a reciprocating driven shaft, a frame secured thereto having a substantially - elliptical guide - ring thereon, pins secured to said frame within said ring adapted to be engaged by the pinion on said gear-wheel, and means for maintaining said pinion in engagement with said pins.

3. In power-transmitting mechanism, the combination with a rotary drive-shaft and a pinion thereon, of an arm or bar loosely mounted on said shaft and having bearings in its outer or free end, a shaft extending through the bearings in said arm, a gear-wheel secured to one end of said shaft and meshing with said pinion, a pinion secured to the inner end of the gear-wheel shaft, a reciprocating driven shaft, a frame adjustably mounted thereon having a substantially-elliptical guide-ring thereon, pins secured to said frame within said ring adapted to be engaged by the pinion on said gear-wheel shaft, a plate connecting the outer ends of said pins and a roller upon the inner end of the gear-wheel shaft adapted to engage the inner wall of said ring.

4. In power-transmitting mechanism, the combination with a rotary drive-shaft and a pinion thereon, of an arm or bar pivotally mounted on said shaft and having bearings in its outer end, a gear-wheel shaft loosely mounted in said bearings, a gear-wheel upon one end of said shaft meshing with the said pinion, a pinion upon the other end of said gear-wheel shaft, a reciprocating driven shaft, a frame adjustably secured thereto having a substantially-elliptical ring thereon, pins secured to said frame within said ring adapted to be engaged by the pinion on said gear-wheel shaft, a plate connecting the outer ends of said pins whose outer edges are substantially parallel with the inner walls of said ring and are adapted to lie within a recess or cut-away portion in said gear-wheel shaft, and a roller upon the inner end of the latter shaft adapted to engage the inner walls of said ring.

5. In power-transmitting mechanism, the combination with a rotary drive-shaft and a pinion thereon, of an arm or bar pivotally mounted on said shaft and having bearings in its outer end, springs engaging the opposite sides of said arm or bar for resisting the pivotal movement thereof, a gear-wheel shaft loosely mounted in said bearings, a gear-wheel upon one end of said shaft meshing with the said pinion, a pinion upon the other end of said gear-wheel shaft, a reciprocating driven shaft, a frame adjustably secured thereto having a substantially-elliptical ring thereon, pins secured to said frame within said ring adapted to be engaged by the pinion on said gear-wheel shaft, a plate connecting the outer ends of said pins whose outer edges are substantially parallel with the inner walls of said ring and are adapted to lie within a recess or cut-away portion in said gear-wheel shaft, and a roller upon the inner end of the latter shaft adapted to engage the inner walls of said ring.

In testimony whereof I have hereunto set my hand in presence of two subscribing witnesses.

PAUL S. DUREL.

Witnesses:
B. VANON,
WALTER SCOTT.